F. HICKMAN.
LUBRICATING STRIP OR ELEMENT.
APPLICATION FILED FEB. 24, 1917.

1,235,475.

Patented July 31, 1917.

Inventor
Francis Hickman,

Witnesses
Chas. S. Hyer

By
Attorney

UNITED STATES PATENT OFFICE.

FRANCIS HICKMAN, OF BOUNDBROOK, NEW JERSEY, ASSIGNOR TO BOUND BROOK OIL-LESS BEARING COMPANY, OF BOUNDBROOK, NEW JERSEY, A CORPORATION OF NEW JERSEY.

LUBRICATING STRIP OR ELEMENT.

1,235,475.      Specification of Letters Patent.      Patented July 31, 1917.

Application filed February 24, 1917. Serial No. 150,788.

*To all whom it may concern:*

Be it known that I, FRANCIS HICKMAN, a citizen of the United States, residing at Boundbrook, in the county of Somerset and State of New Jersey, have invented new and useful Improvements in Lubricating Strips or Elements, of which the following is a specification.

This invention relates to a lubricating strip or element adapted to be disposed between the leaves of a compound spring, such as the elliptical or semi-elliptical springs commonly used for supporting vehicle bodies on their running gear and also between parts of these springs and the vehicle bodies or spring connections. One object of the lubricating strip or element is to uniformly lubricate all parts of the spring leaves between which the strip or element is introduced by providing a strip or element which is fully saturated throughout its length and width with a lubricating material or compound, thereby rendering the leaf components of a spring free in their action and noiseless, and, moreover, reducing the wearing tendency of one spring leaf relatively to another and as a consequence prolong the life by increasing the durability of spring devices. A further object of the invention is to structurally economize in the production of a lubricating strip or element for use between different leaf components of a spring and between the spring and body of a vehicle and to produce the strip or element in a convenient commercially usable condition and whereby it may be procured in bulk or quantity and applied by the user as desired at a comparatively small expense.

With these and other objects and advantages in view the invention consists in the construction and arrangement of the several parts which will be more fully hereinafter described and claimed.

Figure 1:
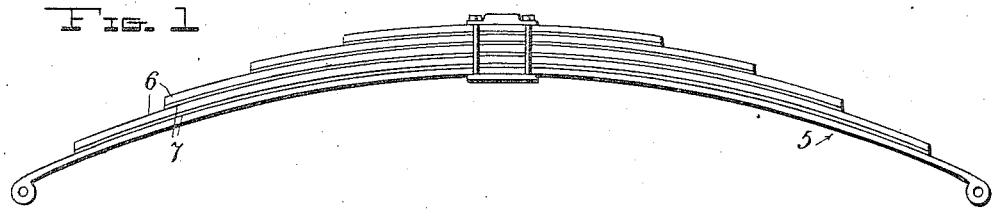
Figure 1 is an elevation of a spring illustrating the improved lubricating strip or element between the leaves thereof.
Figure 2:
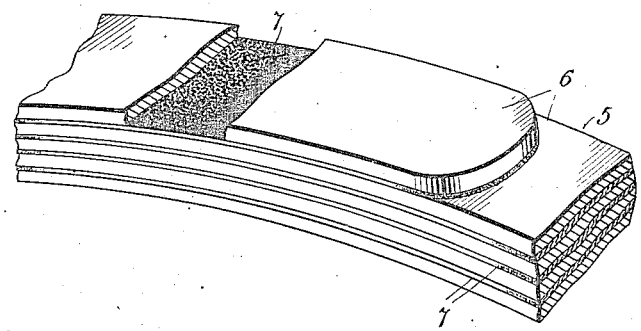
Fig. 2 is an enlarged perspective view of a portion of the leaves, broken away in part, and showing material applied between the leaves.
Figure 3:
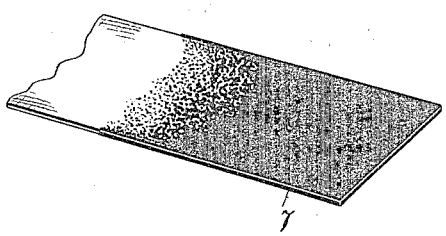
Fig. 3 is a detail perspective view of a portion of the improved lubricating strip or element.
Figure 4:
Fig. 4 is a cross-sectional view on an enlarged scale of the strip or element.

The improved lubricating strip or element is not confined in its use to any particular form of spring, as it is intended to introduce the same between the leaves of any spring where it may be applicable to perform its lubricating function and also to embody such strip or element in connection with any other device or devices where it may be adapted to serve as a lubricating means.

As shown, the numeral 5 designates a semi-elliptical spring comprising a plurality of leaves or leaf components 6 which are assembled in the usual manner and adapted to be introduced between the running gear and body of a vehicle. The improved lubricating element consists of a strip 7 of woven textile fabric, felt, rope paper or other fibrous material of any width or length which is thoroughly saturated with a lubricating material, such as graphite or graphite compound, consisting of graphite and fats or oils. The lubricating material or the graphite and graphite compound is preferably prepared in a fluid condition and the strips of textile fabric or analogous fibrous material are drawn through the fluid or solution so that every part of the strip becomes thoroughly impregnated or saturated with the said lubricating material. It is proposed in preparing the strip to permit it to remain long enough or to move at such speed through the prepared fluid or solution of lubricating material as to accommodate differentiation in the weave or density of the textile fabric or fibrous material, it being obvious that a longer time would be required to saturate a felt strip having close fibrous characteristics than to saturate and thoroughly impregnate a strip of a more open or less dense weave. After the strip of textile fabric or fibrous material has thus been treated with the lubricating material the surplus material is permitted to drain off the same or such material may be removed by any suitable means and the strip or element is then rolled or otherwise prepared in bulk for use. It is also proposed to make the strips or elements of various widths so as to accommodate spring leaves having different widths. In the application of the improved lubricating strip or element it is cut by the user into lengths equaling the spring leaves between which it is placed, it being desirable that the opposite side edges of the strip be coincident with the side edges of the spring leaves.

One of the main advantages of the improved lubricating strip or element is that before application to a spring it is complete in the dissemination of the lubricating material throughout the area of the textile fabric or other fibrous material, and the surfaces of the spring leaves adjacent to the opposite sides of the strip or element are instantly fully lubricated without relying upon the spring leaves to disseminate the lubricating material after the strip or element is applied. By forming the strip or element from textile fabric or fibrous material, such as rope paper, the strip immediately conforms to the contour of the spring leaves and closely adheres to the latter, and, moreover, the improved strip does not in the least interfere with the flexing action of the springs and does not set up the least wear or abrasion on the springs as in the use of wire or metal strips carrying the lubricating material in spots or pads with intervening spaces between them and which require an action of the springs thereon to fully disseminate the lubricant some time after such wire or metal strips have been introduced between the leaves or components of the spring. Moreover, by using a textile fabric strip or a fibrous strip or element of the character specified and fully and throughly saturating the same with a lubricating material, such as graphite or graphite compound, economy in the use of the lubricating material results with a much greater lubricating function when the improved strip or element is primarily applied between the spring leaves or other devices to which it may be applicable. In preparing the strip or element the interwoven threads or the fibers become saturated with and absorb the lubricating material and by this means of preliminary treatment the strip or element is rendered more durable or its service as a lubricating medium is materially prolonged.

In preparing the strip of fibrous material or textile fabric so as to load the same with a lubricant it is preferred that the strip be run through a hot lubricating substance, and while it is hot and fully saturated the strip is next run through or brought into contact with finely ground graphite that is also heated, and is finally passed between press rollers that force the fine graphite into the lubricant and fibers of the strip, thus producing a supersaturated strip holding quite a large quantity of the lubricant. In thus treating the strip of fibrous material or textile fabric the flexibility of the strip is preserved so that the strip when interposed between the leaves of springs may readily conform to the contour of the latter and closely engage the opposing spring leaf surfaces.

What is claimed as new is:

1. A lubricating means of the class specified, for introduction between devices to be lubricated, consisting of a strip of fibrous material thoroughly saturated and impregnated with a lubricating material throughout the entire body thereof prior to the introduction of the strip between the devices to be lubricated, the lubricating material on the strip being comparatively dry.

2. A lubricating means of the class specified, consisting of a strip of absorbent material thoroughly impregnated with a lubricating material prior to the application of the strip, the lubricating material being comparatively dry on the strip.

3. A lubricating means of the class specified, consisting of a strip of fibrous material of an absorbent nature thoroughly saturated and impregnated with a lubricating material prior to the application of the strip, said strip presenting opposed substantially dry lubricating surfaces.

4. A lubricating means of the class specified, consisting of a strip of fibrous material having a lubricating material disseminated fully over the area of the same prior to the application thereof, the lubricated strip being substantially dry and devoid of grooves and openings therein.

5. A lubricating means of the class specified, consisting of a strip of textile fabric having a lubricating material applied thereto and wherewith the said material becomes fully saturated over the entire exposed surface thereof in a substantially dry condition previous to the use of the strip.

6. A lubricating means of the class specified, consisting of a strip of fibrous material thoroughly saturated throughout its area with a lubricating substance having finely ground graphite pressed thereinto preliminary to the application of the said strip for lubricating service.

7. A lubricating means of the class specified, consisting of a strip of textile fabric thoroughly saturated with a lubricating material having finely ground graphite pressed into said material and into the fibers to produce a supersaturated lubricating strip.

In testimony whereof I have hereunto set my hand in presence of two subscribing witnesses.

FRANCIS HICKMAN.

Witnesses:
JOHN L. FLETCHER,
CHAS. S. HYER.